March 3, 1970  R. L. WEHR  3,497,897
VERTICAL GLASS WASHER
Filed March 8, 1968  4 Sheets-Sheet 1

INVENTOR.
ROBERT L. WEHR
By Parmelee, Utzler & Welsh
Attorneys

March 3, 1970 R. L. WEHR 3,497,897
VERTICAL GLASS WASHER
Filed March 8, 1968 4 Sheets-Sheet 3

INVENTOR.
ROBERT L. WEHR
By Parmelee, Utsher & Walsh
Attorneys

March 3, 1970 R. L. WEHR 3,497,897
VERTICAL GLASS WASHER
Filed March 8, 1968 4 Sheets-Sheet 4
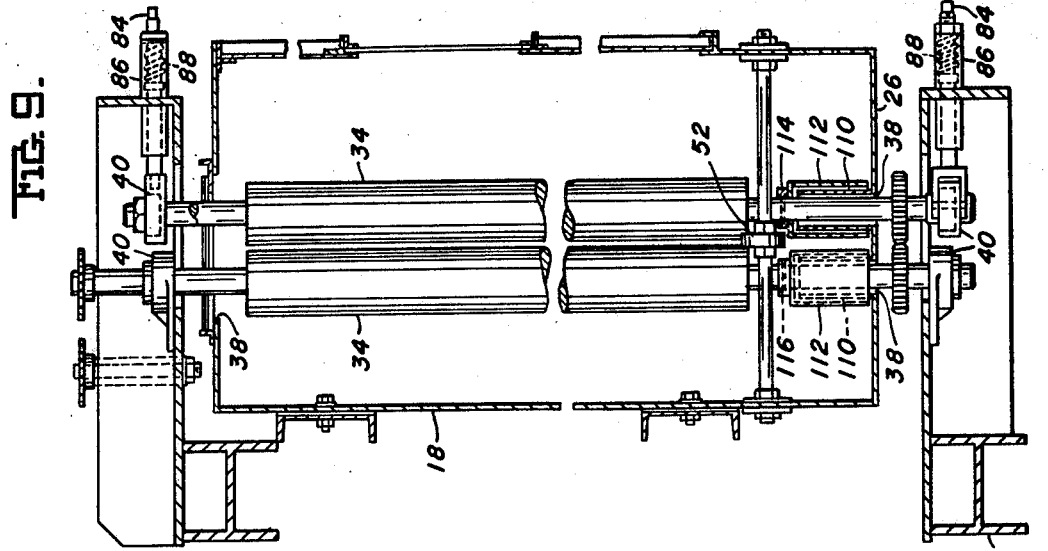
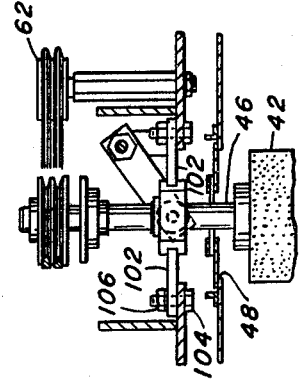
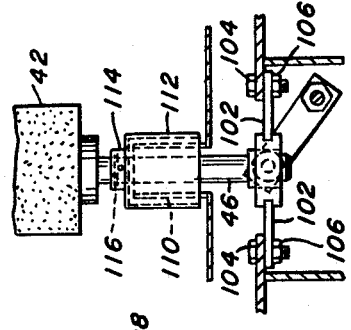
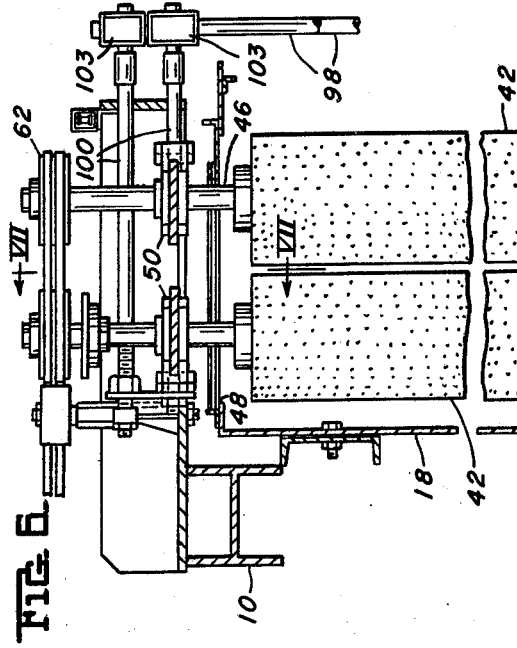
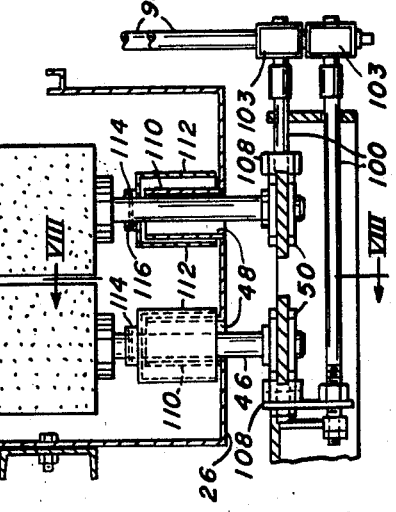
INVENTOR.
ROBERT L. WEHR
By *Parmelee, Utzler & Welsh*
Attorneys

United States Patent Office 3,497,897
Patented Mar. 3, 1970

3,497,897
VERTICAL GLASS WASHER
Robert L. Wehr, Butler, Pa., assignor to Billco, Zelienople, Pa., a corporation of Pennsylvania
Filed Mar. 8, 1968, Ser. No. 711,620
Int. Cl. A47l 15/42; F16j 15/48
U.S. Cl. 15—77                           8 Claims

ABSTRACT OF THE DISCLOSURE

A vertical flat glass washer having an enclosed wash chamber with brush and pinch roll means mounted in the chamber. The brush and roll shafts pass through shaft openings in the bottom wall of the wash chamber and are journaled in bearing assemblies mounted exteriorly of the wash chamber. Sealing assemblies are provided for preventing leakage of liquid from the chamber into the bearing assemblies. The pinch rolls are mounted for self adjustment to permit the passage of various gauges of glass through the wash chamber.

BACKGROUND OF THE INVENTION

Field of the Invention: The present invention relates to seals, and more particularly to a shaft seal of the type adapted to prevent fluid leakage through a shaft opening in a wall. While not limited thereto, as the invention has a wide range of utility, the invention will be illustrated and described in conjunction with a vertical flat glass washer.

Description of the Prior Art: In conventional vertical flat glass washers, the glass is carried through the washer while positioned in a vertical plane. These washers generally comprise an enclosed, horizontally elongated wash chamber having pairs of opposed, vertically extending feed rolls positioned within the chamber for conveying the glass forwardly through the chamber, and pairs of opposed, vertically extending brushes positioned within the chamber for scrubbing the glass as it moves between them. Drive means are provided for rotating the rolls and brushes, and spray means are provided in the chamber for directing a spray of cleaning fluid onto the glass.

In such washers, the bearing assemblies for the brushes and rolls are normally located inside the chamber, sometimes being mounted on the sidewalls of the chamber, and at times being mounted on the bottom wall of the chamber. In either type of construction, cleaning fluid, containing dirt and debris, contacts the bearings tending to foul them. This is especially true when the bottom bearings supporting the rolls and brushes are mounted, on the bottom wall of the chamber because cleaning fluid collects in a pool at the bottom of the wash chamber. What is particularly objectionable with such interior bearing arrangements is the fact that ground glass finds its way into the bearings and damages them. Also, mounting the bearings on the walls of the chamber requires that a heavy gauge of material be used in fabricating the chamber in that the entire weight of the rolls and brushes must be carried by them. Moreover, with such bearing arrangements, gaining access to the bearings for replacement or repair is complicated by the fact that they are located inside the wash chamber.

SUMMARY

Briefly, the present invention provides a vertical flat glass washer having an enclosed wash chamber wherein the roll and brush shafts pass through shaft openings in the bottom wall of the wash chamber and are journaled for rotation in bearing assemblies mounted exteriorly of the wash chamber on the frame of the washer, and novel sealing assemblies for preventing leakage of liquid from the interior of the chamber, through the shaft openings and into the bearing assemblies. Also, the invention provides a novel fashion of mounting the pinch rolls for self adjustment.

To these ends, there is provided a plurality of first sealing members, each of which comprises a flange member on the inner face of the bottom wall of the wash chamber which is spaced from and circumposed around a shaft, and a plurality of second sealing members, each of which comprises a skirt member which is secured to a shaft for rotation therewith. The arrangement being such that each skirt extends downwardly in overlapping relation with a flange member to thereby constitute an effective seal against the flow of fluids from the chamber around the shafts and shaft openings.

By reason of the novel sealing assemblies provided by the invention, ground glass or other debris cannot find its way into the bearing assemblies and therefore bearing life is substantially extended, however, when such bearings do need replacement or repair, the fact that they are located exteriorly of the wash chamber, allows ready access to them. Also, because the bearing assemblies are mounted on the frame of the washer, a lighter gauge material can be used in constructing the wash chamber since the weight of the rolls and brushes is not supported on the walls of the chamber.

Another aspect of the invention is the novel fashion in which the pinch rolls of the washer are mounted for both pivotal and yielding contact with a sheet of glass passing through the washer. The roll mounting provided permits easy passage of various gauges of glass through the wash chamber without the need of adjusting the gap between the rolls for each gauge of glass to be washed while at the same time the mounting of the rolls provides positive contact of the pinch rolls with the smallest gauge to which the washer is adjusted. Also, by reason of the novel fashion in which the rolls are mounted, normal roll wear is compensated for without the need of adjustment of the gap between the rolls.

A more complete understanding of the invention and the advantages thereof may be had from the following detailed description of a preferred embodiment thereof when read in conjunction with the appended drawings.

BRIEF DESCRIPTION OF THE DRAWINGS

FIGURE 6 is an enlarged cross section of the washer taken substantially along the line VI—VI of FIGURE 2 with intermediate portions of the washer broken away for convenience of illustration;

FIGURE 7 is a view taken substantially along the line VII—VII of FIGURE 6 illustrating the top of the brushes;

FIGURE 8 is a view taken substantially along the line VIII—VIII illustrating the bottom of the brushes; and FIGURE 9 is an enlarged cross section of the washer taken substantially along the line IX—IX of FIGURE 2 with intermediate portions of the washer broken away for convenience of illustration.

DESCRIPTION OF THE PREFERRED EMBODIMENT

Figure 1:
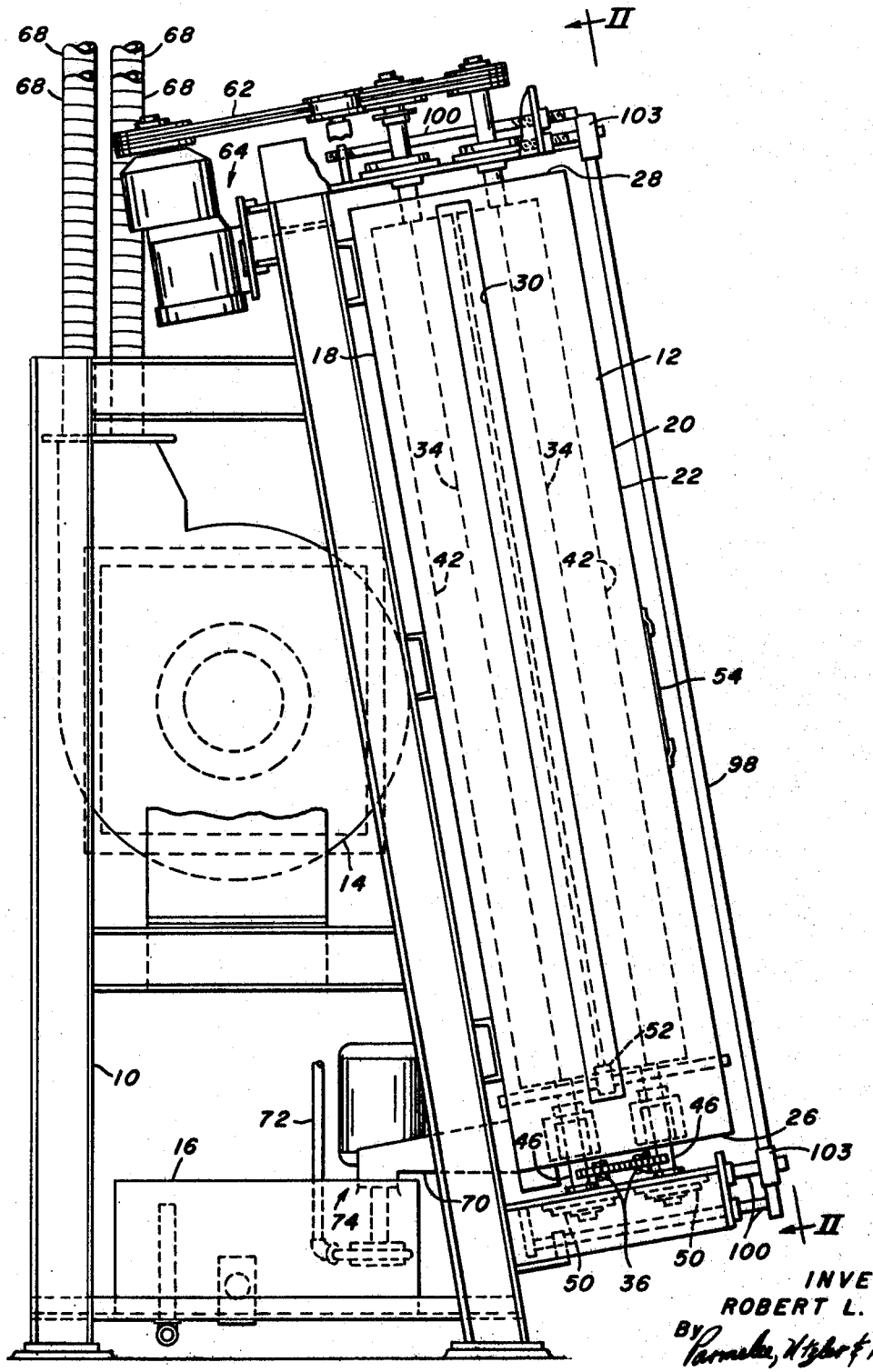
FIGURE 1 is an end elevation of the glass entering side of the vertical washer with portions thereof being broken away for convenience of illustration.
Figure 2:
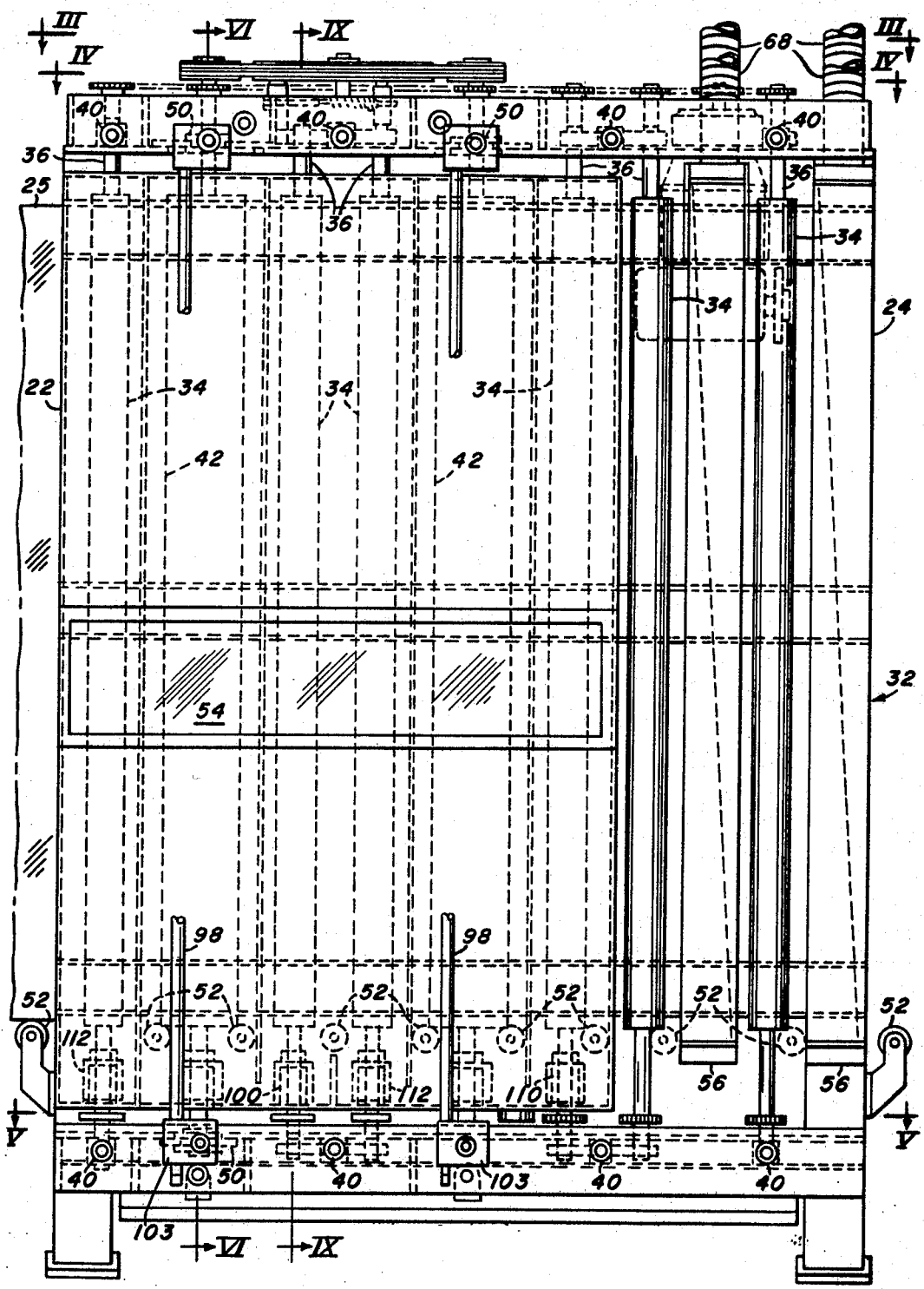
FIGURE 2 is a side elevation of the washer taken substantially along the line II—II of FIGURE 1.

Referring now to the drawings, wherein similar reference characters designate corresponding parts throughout the several views, there is illustrated a vertical flat glass washer which includes a rigid frame 10 supporting an enclosed wash chamber 12 and various other portions of the washer including a blower 14 and a detergent tank 16.

The wash chamber 12 is formed of parallel side walls 18 and 20, parallel end walls 22 and 24 and parallel bottom and top walls 26 and 28, respectively. Entrance and exit openings 30 and 32 are provided in the end walls 22, 24, respectively, to permit a sheet of glass such as that partially shown at 25 to pass through the chamber.

For conveying a sheet of glass through the wash chamber, there are pairs of opposed pinch or feed rolls 34 positioned within the chamber. The rolls 34 are formed of natural or synthetic rubber or the like and each have shafts 36 which pass through openings 38 in the top and bottom walls, and each shaft 36 is journaled for rotation on its vertical axes in top and bottom bearing assemblies 40 that are supported on the frame 10 exteriorly of the chamber 12.

Also positioned within the chamber 12 are pairs of opposed brushes 42 formed of natural or synthetic bristles for scrubbing a sheet of glass moving therebetween and a series of spray heads 44 for directing a spray of cleaning fluid onto the glass. The brushes 42 each have a shaft 46 which passes through the openings 48 in the top and bottom walls, and each shaft 46 is journaled for rotation in bearing assemblies 50 that are also supported on the frame 10 exteriorly of the chamber 12.

Idler rollers 52 are rotatably mounted on the chamber 12, for supporting the glass sheet along its path of travel as it passes through the chamber, and a sight glass 54 is provided in side wall 20 to permit viewing of the interior of the chamber. For drying the glass sheet prior to its exit from the chamber 12, there is provided within the chamber two pairs of opposed air knives 56.

Figure 4:
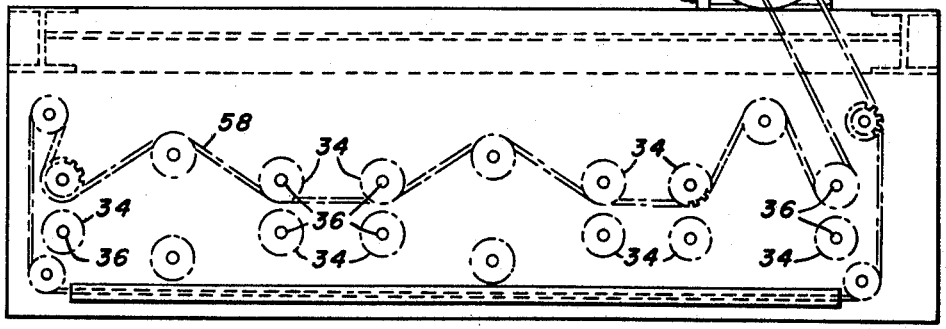
FIGURE 4 is a plan view taken substantially along the line IV—IV of FIGURE 2 illustrating the roll drive.

Referring now to FIGURE 4, it will be noted that the feed rolls 34 are driven through their respective shafts by means of a chain and sprocket drive system. A chain 58 is interconnected with roll shafts and the chain is driven by an electric motor and speed reducer unit 60 mounted on the frame 10. All of the feed rolls are therefore driven at the same speed and by the single chain 58.

Figure 3:
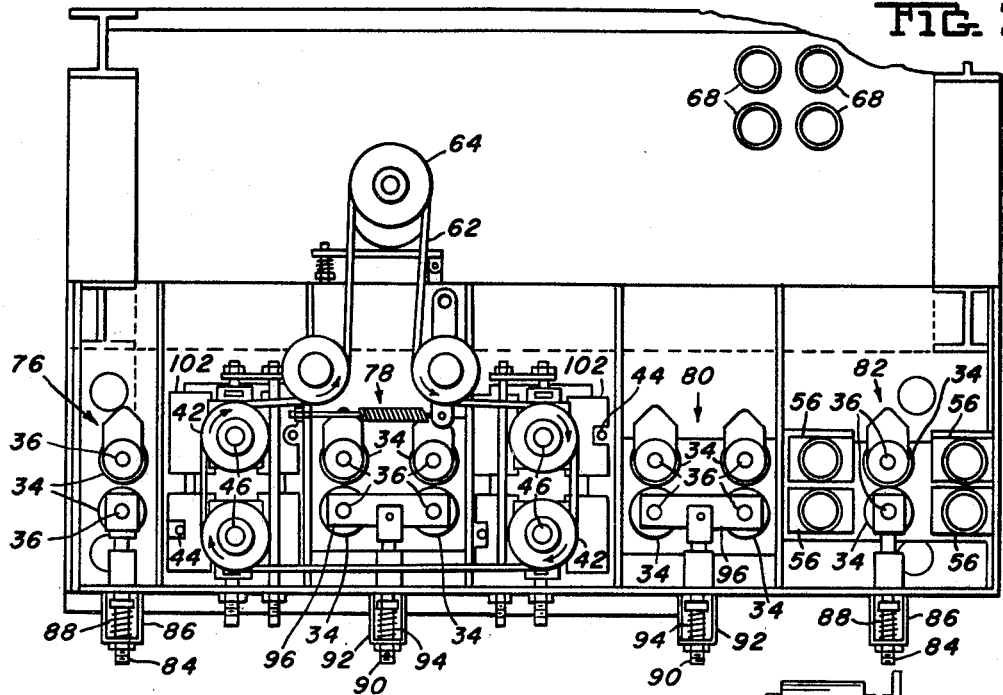
FIGURE 3 is a plan view of the washer taken substantially along the line III—III of FIGURE 2 illustrating the brush drive.

Similarlly, as best seen in FIGURE 3, the two pairs of opposed brushes 42 are driven through their respective shafts by a belt and pulley system. A belt 62 is interconnected with the brush shafts as illustrated in FIGURE 3 and the belt is driven by another electric motor and speed reducer unit 64 mounted on the frame 10. As is the case with the rolls 34, all of the brushes are driven at the same speed and by the single belt 62.

In operation of the apparatus, pieces of glass which lie in a general vertical plane relative to the wash chamber 12, are carried to the washer where they are engaged by the first pair of opposed feed rolls 34 which convey the glass forwardly into the wash chamber. As the glass passes through the washer, it is washed by the action of the spray and brushes and dried by the action of the air knives at the exit end of the wash chamber. The air for the air knives is supplied thereto through flexible conduits 68 which are in turn connected to the blower 14. Cleaning fluid from the spray headers 44 containing detergent or the like is drained from the chamber through a discharge conduit 70 into the detergent tank 16. The cleaning fluid is recirculated to the spray headers 44 through pipe 72 by the action of the motor and pump assembly shown generally at 74.

Figure 5:
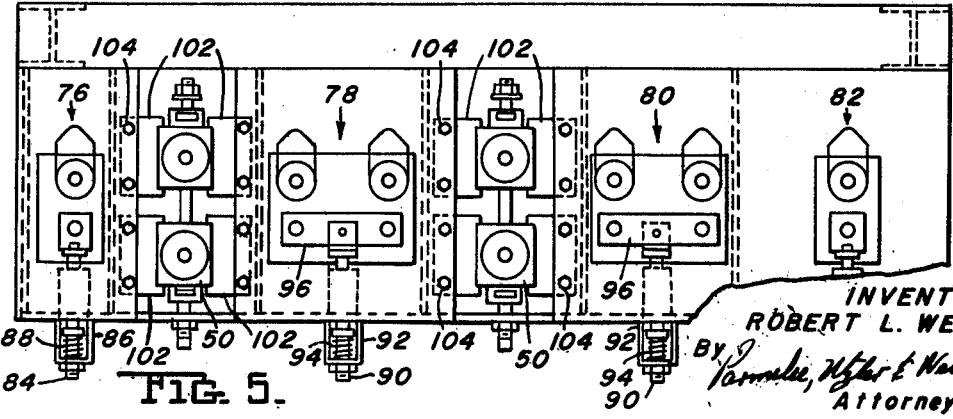
FIGURE 5 is a view taken substantially along the line V—V of FIGURE 2 illustrating the lower bearings.

Referring now particularly to FIGURES 3 and 5, it will be seen that there are four groups of pinch rolls within the wash chamber 12. These groups are designated generally by the reference numerals 76, 78, 80 and 82. The lower rolls, as viewed in FIGURES 4 and 5 of the groups 76 and 82 are supported for movement towards and away from the upper rolls by means of screw-threaded rods 84 which are slidably received within guide structures 86. Springs 88 bias the lower rolls of groups 76 and 82 towards their opposed upper rolls. This arrangement assures positive contact between the rolls and glass sheets.

The group of rolls 78 and 80 each comprise two pairs of opposed feed rolls in succession which constitute a set of two successive rolls on each side of the path of travel of the glass. The lower rolls of each set, as viewed in FIGURES 4 and 5, are likewise supported for movement towards and away from the upper set of rolls by means of threaded rods 90 which are slidably received within guide structures 92. Springs 94 bias the lower set of rolls of groups 78 and 80 towards their opposed upper rolls.

The lower set of rolls of groups 78 and 80 are also pivotally mounted to permit pivotal movement of these sets toward and away from a sheet of glass passing through the washer. To this end a rocker arm 96 rigidly interconnects the shafts of each lower set of each group 78, 80, and the rods 90 are connected to the rocker arms 96 intermediate the roll shafts. By reason of this construction, when the leading edge of a glass sheet makes contact with these groups of rolls, the lower sets of rolls yield and pivot outwardly away from the glass, thereby permitting glass of various gauges or thickness to more easily enter the gap between the opposed sets of rolls. This arrangement, therefore, permits the gap between the opposite sets of rolls to be set smaller than would otherwise be possible if the lower rolls of the groups 78 and 80 were not pivotally mounted. This feature is also desirable in that the rolls wear in time, and by reason of the spring mounting, roll wear is compensated for by the inherent self-adjusting feature of the springs. This same advantage is also inherent in the spring mountings of the rolls of the groups 76 and 82.

The rotary brushes 42 in time will wear, becoming less effective in their scrubbing action, and therefore the brushes 42 are adjustably mounted for movement towards and away from each other to compensate for such brush wear as it occurs. As shown best in FIGURES 6–8, the tops and bottoms of the brushes on each side of the path of travel of the glass are adjustable through a right angle gearing system comprising screw threaded vertical shafts 98 disposed in parallelism to the brushes, and horizontally disposed screw threaded shafts 100 screwed through threaded holes provided in the frame 10. The top and bottom bearing assemblies 50 of the brush shafts 46 are rigidly secured to slide plates 102. The slide plates 102 have openings in registry with slot-like openings in the frame 10 through which the bolts 104 pass. Nuts 106 are screwed onto the bolts 104 fastening the slide plates 102 to the frame 10. To adjust a given brush 42, the shaft 98 associated with the brush to be adjusted is rotated to effect the simultaneous rotation of its associated shafts 100 through gear boxes 103. Rotation of these latter shafts 100 causes them to move laterally through the threaded holes in the frame 10 and by reason of a nut 108 rigidly secured to each of the shafts 100 and rotatably attached to the bearing assemblies 50 the shaft 46 and thus brush 42 moves toward or away from its opposed brush depending on the direction of rotation of the rotated shafts 98. To permit such adjustments of the brushes 42, the shaft openings 48 are made substantially larger than the brush shafts 46 passing therethrough.

Now referring more particularly to FIGURES 6–9, cooperating means are provided on the roll and brush shafts and on the bottom wall 26 of the wash chamber which constitute a seal against the flow of fluids from the wash chamber around the shafts and shaft openings.

The seal comprises a first sealing member or upwardly extending, cylindrical flange 110 integral with the inner face of the lower wall and around each of the lower shaft openings 38 and 48. The flanges 110 are spaced from and circumposed around each shaft with each shaft passing through the openings 112 provided by the cylindrical wall of each flange 110. Second sealing members or cylindrical skirts 112 are mounted in fluid sealing relation on each shaft for rotation therewith by means of a collar 114 and O-ring 116 positioned between the collars 114 and the shafts. The cylindrical skirts 112 extend downwardly in overlapping relation with each of the flanges 110 and are spaced from and circumposed around each of them.

The sealing assemblies thus provided, prevent leakage of liquid through the openings 38 and 48 from the interior of the chamber and into the bearing assemblies 40 and 50 due to the fact that any liquid collecting in the bottom of the chamber 12 must rise to the height of the flanges 110 before it can exit through the openings. As the liquid used to wash the glass is constantly being discharged through conduit 70, there is little likelihood that liquid would rise to the height of the flanges 110 and spill thereover.

From the foregoing, it will be seen that I have provided an effective self-adjusting shaft seal for preventing leakage of liquid from the interior of the chamber 12, through the shaft openings and into the bearing assemblies having no wearing parts.

Having thus described the invention, what is claimed and desired to be secured by Letters Patent is:

1. In an article treating apparatus of the type having a chamber for treating the articles with liquid, a wall for the chamber with an opening, a shaft passing through the opening, and a bearing assembly secured to the apparatus exteriorly of the chamber for rotatably supporting one end of the shaft, the improvement comprising a sealing assembly for preventing leakage of liquid through the opening from the interior of the chamber and into the bearing assembly including a first member integral with the inner face of the wall and having a central opening through which the shaft passes, the first member surrounding the opening in the wall and extending into the chamber, and a second member secured to the shaft and surrounding the first member.

2. In a vertical glass washer having a frame, a washing chamber mounted on the frame, at least one pair of opposed rolls positioned within the chamber for conveying a sheet of glass therethrough, at least one pair of opposed brushes positioned within the chamber for scrubbing a sheet of glass moving therebetween, the chamber having side walls parallel to the path of travel of glass, a top wall and a bottom wall, the rolls and brushes being vertically disposed within the chamber and each having shafts extending through shaft openings in the bottom wall of the chamber, drive means for rotating the rolls and brushes, and spray means in the chamber for directing a spray of cleaning fluid onto the glass, the improvement comprising:

(a) bearing means at each end of the roll and brush shafts, the bearing means on the lower ends of the shafts being located outside the chamber below the bottom wall, and (b) cooperating means on each shaft and on the bottom wall inside the chamber constituting a seal against the flow of fluids from the chamber around the shafts and shaft openings.

3. Apparatus as defined in claim 2 wherein the seal comprises:

(a) upwardly-extending flanges around each shaft opening spaced from and circumposed around each shaft, and (b) skirts mounted on each shaft for rotation therewith and extending downwardly in overlapping relation with the flanges, the skirts being spaced from and circumposed around the flanges.

4. Apparatus as defined in claim 2 wherein the seal comprises:

(a) an upwardly-extending cylindrical flange around each shaft opening which is spaced from and circumposed around each shaft, and (b) a cylindrical skirt mounted in fluid sealing relation on each shaft for rotation therewith and extending downwardly in overlapping relation with each of the flanges, the skirts being spaced from and circumposed around each of the flanges.

5. In a vertical glass washer as defined in claim 2 wherein the brush shaft openings are substantially larger than the brush shafts, and means for adjusting the brush shafts to vary the spacing between opposed pairs of brushes.

6. In a vertical glass washer as defined in claim 2 wherein there are two pairs of opposed rolls in succession constituting a set of two successive rolls on each side of the path of travel of the glass, and means for pivotally mounting at least one of the sets of rolls to permit pivotal movement of the rolls of that set toward and away from a sheet of glass passing through the washer.

7. Apparatus as defined in claim 6 wherein the means for pivotally mounting the one set of rolls comprises a rocker arm rigidly connecting the shafts of the rolls, and a rod connected at one end to the frame and at its other end to the rocker arm intermediate the roll shafts.

8. Apparatus as defined in claim 7 including biasing means connected to the rocker arm for resiliently urging the one set of rolls toward the opposite set of the two pairs of rolls.

References Cited
UNITED STATES PATENTS

| | | | |
|---|---|---|---|
| 2,014,859 | 9/1935 | Mitchell | 277—57 X |
| 2,583,671 | 1/1952 | Schmitter | 277—57 |
| 2,914,784 | 12/1959 | Floyd | 15—77 X |
| 3,093,852 | 6/1963 | Madge | 15—77 |

EDWARD L. ROBERTS, Primary Examiner

U.S. Cl. X.R.

277—57